United States Patent [19]
Bretone, Jr.

[11] 4,191,407
[45] Mar. 4, 1980

[54] PIPE COUPLING FOR PLUMBING APPARATUS

[76] Inventor: John Bretone, Jr., 91 Woodview Rd., West Hempstead, N.Y. 11552

[21] Appl. No.: 846,971

[22] Filed: Oct. 31, 1977

[51] Int. Cl.² ............................................. F16L 55/00
[52] U.S. Cl. ........................................ 285/56; 4/211; 285/177; 285/331
[58] Field of Search ............ 285/56, 58, 59, 60, 285/237, 236, 331, 225, 423, 52, 53, 177; 4/211, 252 R

[56] References Cited

U.S. PATENT DOCUMENTS

| | | | |
|---|---|---|---|
| 562,963 | 6/1896 | Horner | 285/236 |
| 2,765,182 | 10/1956 | Williamson, Jr. | 285/225 X |
| 3,408,091 | 10/1968 | Zylstra | 285/253 X |
| 3,476,408 | 11/1969 | Wolfe | 285/423 X |
| 3,680,896 | 8/1972 | Cupit | 285/177 |
| 3,807,744 | 4/1974 | Gibling | 285/58 X |
| 4,038,737 | 8/1977 | Bretone, Jr. | 285/236 X |

FOREIGN PATENT DOCUMENTS

| | | | |
|---|---|---|---|
| 270109 | 11/1950 | Switzerland | 285/331 |
| 455417 | 7/1968 | Switzerland | 285/331 |
| 776837 | 6/1957 | United Kingdom | 285/236 |
| 852681 | 10/1960 | United Kingdom | 285/331 |
| 1048377 | 11/1966 | United Kingdom | 285/331 |

*Primary Examiner*—Thomas F. Callaghan
*Attorney, Agent, or Firm*—Lerner, David, Littenberg & Samuel

[57] ABSTRACT

A plumbing connector and a method for installing or replacing pipe which extends between a toilet and a ferrule utilize a pair of sleeves arranged coaxially so as to form an annular socket for receiving one end of the ferrule. The inner sleeve is adapted for permanent connection to the pipe.

8 Claims, 4 Drawing Figures

U.S. Patent    Mar. 4, 1980    4,191,407
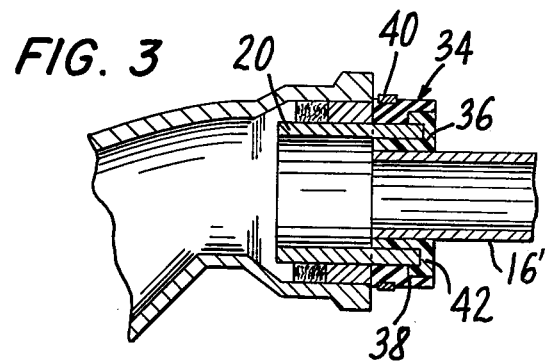
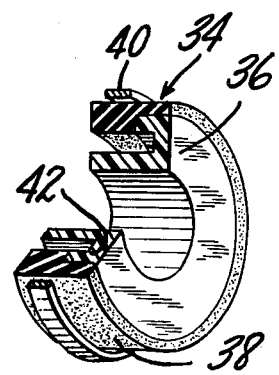
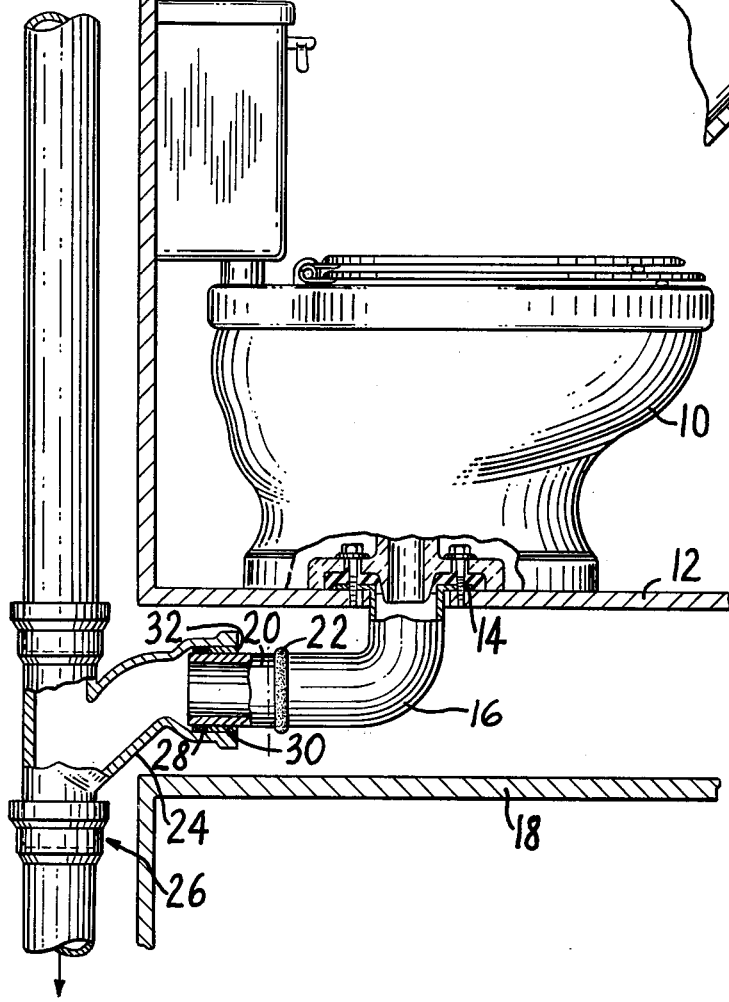
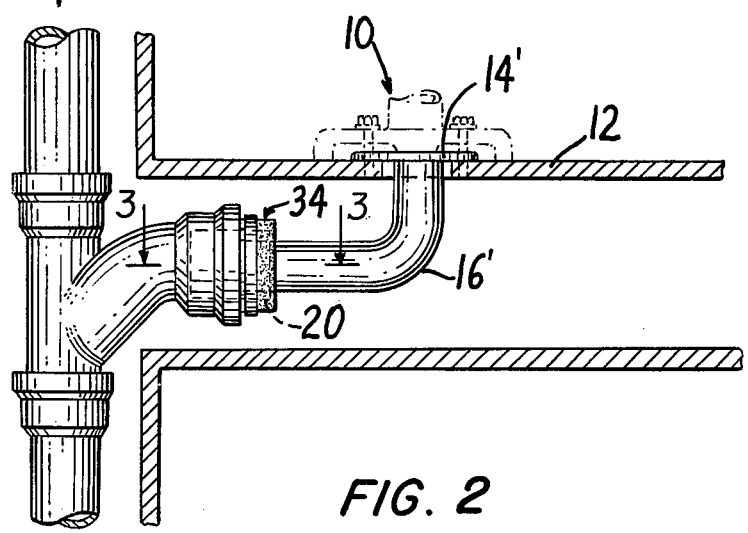

PIPE COUPLING FOR PLUMBING APPARATUS

BACKGROUND OF THE INVENTION

Conventional toilet plumbing installations utilize a lead (Pb) pipe which extends downwardly from the bowl of the toilet into the space between the floor supporting the toilet and the ceiling of the room beneath the toilet. The lead pipe curves in this space about 90° for joining with a ferrule by a wiped solder joint. The ferrule is usually sealed to a TY section of a soil stack with a caulked lead (Pb) and oakum joint. Occasionally, the lead pipe may extend between the toilet and the ferrule without bending, for example, when a toilet is installed in a cellar and directly connected to a sewer beneath the cellar.

The soil stack and TY section are usually made from a thick cast iron, which gives them a long life expectancy. Likewise, the ferrule has a long life expectancy due mainly to its thick brass construction. Inasmuch as the pipe from the toilet to the ferrule, however, is often made from lead (Pb), it has a considerably shorter life expectancy than the soil stack, TY section and ferrule, and, therefore, often becomes the first portion of the toilet plumbing installation to deteriorate and leak.

Installing the lead (Pb) pipe for toilets in new building structures has required both considerable effort and careful scheduling relative to completion of other portions of the structure to facilitate its installation. The oakum must first be packed between the ferrule and the TY section then lead, heated to approximately 700° F. (370° C.), poured over the oakum between the ferrule and the TY section. Caulking of the cooled lead joint with special chisels then completes the seal between the ferrule and TY section. The other end of the ferrule has been previously fitted to the lead pipe with a sealing bead of solder wiped about the fitted joint. The pipe usually curves upwardly from the joint through a floor built above the lead pipe for supporting the toilet. A flange is then secured to the end of the lead pipe at the floor, the flange being subsequently secured to the toilet. The flange may also be secured to the floor with fasteners.

The ceiling of the room beneath the toilet may then be installed. However, it cannot be installed until the plumbing for the toilet has been completed because the limited space between the floor which supports the toilet and the ceiling of the room beneath the toilet usually does not provide enough space for making the caulked lead (Pb) and oakum joint used in installing the toilet. Thus, even in new building structures, installing a toilet has required both a caulked oakum and lead (Pb) joint and a solder joint, both of which are difficult and time consuming to make, as well as scheduling of the construction to first complete the plumbing for the toilet and then finish the floor which supports the toilet and the ceiling of the room below the toilet.

When the pipe from a toilet springs a leak, it must, of course, be replaced. Replacing a lead (Pb) pipe, like initially installing the lead (Pb) pipe, has been a difficult and time-consuming operation. The toilet must first be removed from the flange on the pipe. A hole is then cut in the floor which supported the toilet to provide access to the leaking pipe. The leaking lead pipe is then cut off, usually with a reciprocating saw. The caulked oakum and lead joint must also be removed, a process which usually requires that the ferrule be removed with a hammer and chisel. If the hammering and chiseling damages the TY section of the soil stack, which due to its cast iron construction, can crack and cannot be repaired, a major reconstruction job of replacing the TY section becomes necessary.

Even if the old ferrule is successfully removed from the TY section without being damaged, a new ferrule must then be installed. Installing the new ferrule requires inserting a new oakum packing, pouring molten lead about the oakum, and then caulking the molten lead to again form a permanent seal between the ferrule and the TY section. The new lead (Pb) pipe must also be connected to the new ferrule with a wiped solder joint.

The limited space between the floor which supports the toilet and the ceiling of the room beneath the toilet usually prevents properly forming the caulked oakum and lead joint between the TY section of the soil stack and the ferrule without opening the ceiling of the room beneath the toilet and the floor which supports the toilet. Both the floor and ceiling must then be replaced, making the installation of the new lead (Pb) pipe quite expensive. In addition, the old ferrule was probably in satisfactory condition, as a result of its heavy brass construction, even though the lead (Pb) pipe had sprung a leak. Replacing the old, but structurally sound, ferrule with a new ferrule then wastefully requires supplying the new ferrule. Of course, proper tools, including equipment for heating the new molten lead (Pb) joint to approximately 700° F. (370° C.), are also needed.

Although it would seem that an easier way of replacing the leaking lead (Pb) pipe would be to separate the old pipe from the ferrule at the wiped solder joint and then connect a new lead (Pb) pipe to the old ferrule with a new wiped solder joint, the wiped solder joint cannot be formed satisfactorily while the ferrule is connected to the TY section of the soil stack. Even if a way of properly forming the solder joint between the pipe and ferrule while the ferrule is connected to the TY section were found, forming such a joint would still be likely to require removing the ceiling of the room beneath the toilet and the floor which supports the toilet to provide adequate room for forming the solder joint. The additional expense of replacing the ceiling as well as the floor will thus still be incurred.

In recent years polyvinyl chloride (hereinafter PVC) plumbing pipes have become available. Such PVC pipes, however, have not been available long enough to have been used in a significant portion of toilet installations in this country. In addition, after the recent introduction of PVC pipes, their use was resisted until the satisfactory performance of such pipes could be demonstrated and local building codes changed to permit their use. PVC pipes are thus not likely to be found in even relatively recent structures and are even less likely to be found in structures which are old enough for a lead (Pb) pipe to have deteriorated sufficiently to leak. Most toilets are thus connected to a cast iron soil stack by a lead (Pb) pipe and brass ferrule as described above.

In my U.S. patent application Ser. No. 610,863, filed Sept. 5, 1975, now U.S. Pat. No. 4,038,737, dated Aug. 2, 1977, there is disclosed a novel method and apparatus for installing or replacing a discharge pipe which extends between a toilet and a ferrule structure. The method and apparatus couple a discharge pipe to the ferrule structure with a compressible sleeve which extends over facing ends of the discharge pipe and ferrule structure. Ring clamps compress and seal the sleeve to the discharge pipe and the ferrule structure.

Although the sleeve employed in the method and apparatus described and illustrated in my U.S. Pat. No. 4,038,737 overcomes the problems and difficulties discussed above, its design creates certain additional problems. For instance, inasmuch as the sleeve is necessarily flexible enough to be compressed about the ferrule structure and the discharge pipe, the sleeve provides only limited support for the discharge pipe. The support for pipes which are joined by a flexible, compressible sleeve not only must be adequate to support the pipes when they are installed, but also must be adequate enough to keep the pipes from shifting and sagging over the years after they are installed. Preventing movement of the pipes is particularly important when one of the pipes joined by such a sleeve is the discharge pipe from a toilet, because movement of the discharge pipe relative to the toilet could cause a leak between the toilet and pipe. Inasmuch as the toilet covers the discharge pipe, such a leak might not be detected until it causes noticeable and severe damage to the structure about the toilet.

Moreover, because the compressible sleeve is designed to cooperate with a bead formed at the end of the ferrule structure remote from the soil stack, the ferrule structure cannot be shortened by removing the end with the bead. Shortening the ferrule structure would provide additional room for the installation or replacement of the discharge pipe, and, therefore, would be very advantageous.

SUMMARY OF THE INVENTION

The present invention overcomes all the problems and difficulties discussed above by providing a novel and unique connector for use in a new and improved method and apparatus for installing or replacing a toilet discharge pipe.

The new and improved method of installing or replacing a discharge pipe from a toilet first obtains access to the space for the pipe. Access is usually obtained by forming an opening either by leaving incomplete a portion of a floor of a new structure at the location for the toilet or by removing the toilet and a portion of the floor therebeneath in an existing structure in which it is desired to replace the discharge pipe.

The method next forms a ferrule which extends from and communicates with a TY section of a soil stack or similar portion of a sewage system. If the toilet is being first installed, a ferrule may be installed in and sealed to the TY section of the soil stack in the conventional way with an oakum packing, molten lead and caulking. Alternatively, the ferrule may be formed from PVC and adhesively sealed to the TY section. The ferrule differs from the one described and illustrated in my U.S. Pat. No. 4,038,737 in that there is no bead about the end which projects from the TY section of the soil stack. When replacing a lead (Pb) pipe, it may be removed by severing the ferrule at a location between the wiped solder joint and the TY section of the soil stack, thereby also removing the bead.

The method then connects one end of a new discharge pipe to the ferrule with a connector which includes a pair of coaxially arranged sleeves. The inner sleeve receives one end of the new discharge pipe, which is adhesively attached to the inner sleeve. A flange extends radially outward from the inner sleeve, the outer sleeve being attached to the flange to form an annular socket for receiving the free end of the ferrule. A ring clamp extends about the portion of the connector adjacent the TY section of the soil stack. The outer sleeve is flexible so that the ring clamp may be tightened to compress the outer sleeve onto the ferrule for sealing and removably connecting the ferrule to the discharge pipe. Cementing the inner sleeve to the discharge pipe not only provides a more positive connection, but also reduces the number of required parts by eliminating a second ring clamp.

Inasmuch as the inner sleeve can be a relatively rigid and durable plastic, it provides improved support for the discharge pipe. To make the discharge pipe as light as possible for the best support by the connector, the discharge pipe is also preferably a plastic, such as PVC. The discharge pipe can extend all the way into the connector for further support. By varying the position of the discharge pipe relative to the connector, the length of the discharge pipe between the ferrule and the toilet can be adjusted without stocking and selecting pipe of the length required for each toilet installation.

BRIEF DESCRIPTION OF THE DRAWING

For a more complete understanding of the invention, reference may be had to the following description of an exemplary embodiment taken in conjunction with the accompanying figures of the drawing, in which:

FIG. 1 is an elevational view, partly in section, of a typical toilet installation having a lead (Pb) discharge pipe which needs replacement;

FIG. 2 is an elevational view of the installation shown in FIG. 1 after the discharge pipe has been replaced using a connector designed and installed in accordance with the invention;

FIG. 3 is a cross-sectional view, taken along the line 3—3 in FIG. 2 and looking in the direction of the arrows, of the connector illustrated in FIG. 2; and FIG. 4 is a perspective view, partly cut away, of the connector shown in FIGS. 2 and 3.

DESCRIPTION OF AN EXEMPLARY EMBODIMENT

FIG. 1 illustrates a typical toilet installation in an existing, completed building. A toilet 10 is supported on a floor 12. The bottom of the toilet is connected and sealed to a flange 14 of a lead (Pb) discharge pipe 16. Although the discharge pipe 16 is sometimes straight, most often the pipe has about a 90° bend from a vertical section which extends downwardly from the toilet 10 to an essentially horizontal section for accommodating the discharge pipe 16 in the space between the floor 12 and a ceiling 18 of a room beneath the toilet 10. Such lead discharge pipes are sometimes called lead bends.

An end of the lead pipe 16 remote from the toilet 10 is connected to one end of a ferrule 20 by a wiped solder joint 22. The wiped solder joint 22 forms a bead about facing ends of the pipe 16 and the ferrule 20.

The other end of the ferrule 20 is connected to and sealed in an opening in a TY section 24 of a soil stack 26. An oakum packing 28 and lead 30 caulked at 32 form the seal between the ferrule 20 and the TY section 24. The oakum packing 28 is at an end of the seal innermost of the TY section 24. The layer of lead 30 is formed by pouring molten lead about the oakum packing 28 and the outer edge of the cooled molten lead is then caulked at 32.

Experience has shown that this substantial caulked oakum and lead seal is required to form a fluid and gas tight seal between the ferrule 20 and the TY section 24 in the corrosive environment of toilet effluent and sewer gas. Experience has also developed the common practice of forming the TY section 24 and soil stack 26 of relatively thick cast iron and the ferrule 20 of relatively thick brass to also resist the corrosive environment. Because the discharge pipe 16, is often formed of lead (Pb), it is subject to abrasion by the effluent at the bend in the pipe and corrosion by effluent residue which reaches the pipe before it reaches the ferrule 20 or soil stack 24. For these and other reasons the lead discharge pipe 16 often deteriorates and leaks while the ferrule 20 and soil stack 26 are substantially undeteriorated. The discharge pipe 16 must then be replaced, but there is no inherent reason for replacing the ferrule 20 or the soil stack 26.

Unfortunately, however, the wiped solder joint 22 required for sealing a replacement lead (Pb) discharge pipe to the ferrule 20 cannot be replaced while the ferrule 20 is sealed to the TY section 24 of the soil stack 26. The ferrule 20 thus heretofore has had to be removed from the TY section 24, a replacement ferrule connected to the replacement lead (Pb) discharge pipe, and the new ferrule and lead discharge pipe then connected to the TY section 24. The process of removing the ferrule 20 from the TY section 24 is particularly onerous and presents some risk of damaging the TY section 24 which then necessitates a major undertaking to replace the damaged TY section. In addition, to replace the ferrule 20, it is often necessary to open the ceiling 18 to gain access for sealing the new ferrule to the TY section 24 with the caulked oakum and lead joint.

To replace the lead (Pb) discharge pipe, the toilet 10 is removed and an opening is formed in the floor 12 to provide access to the discharge pipe 16, which can then be removed by severing the ferrule 20 between the wiped solder joint 22 and the TY section 24 of the soil stack 26. The seal between the ferrule 20 and the TY section 24 is thus undisturbed and no opening in the ceiling 18 is required to gain access for replacing the seal.

FIG. 2 shows a replacement discharge pipe 16', preferably made of PVC, connected to the ferrule 20. A connector 34 extends about the end of the ferrule 20 which overlaps the horizontal section of the discharge pipe 16'. The end of the horizontal section of the discharge pipe 16' preferably has an external diameter slightly smaller than the internal diameter of the connector 34, so that the discharge pipe 16' can extend into the connector 34.

With particular reference to FIGS. 2 and 3, the connector 34 consists of three basic elements: an inner sleeve 36; and outer sleeve 38 and a ring clamp 40. The end of the inner sleeve 36 remote from the TY section 24 of the soil stack 26 has a circumferential flange 42, which is permanently joined, for instance, by a suitable adhesive, to a corresponding end of the outer sleeve 38. The inner and outer sleeves 36 and 38, respectively, are arranged coaxially so as to form a socket for the free end of the ferrule 20.

The inner sleeve 36 is PVC, so that it can be cemented to the replacement discharge pipe 16' at the job site. Although the inner sleeve 36 is shown as being substantially coextensive with the outer sleeve 38, the inner sleeve 36 can be made longer than the outer sleeve 38 to increase the surface area for bonding the connector 34 to the replacement discharge pipe 16'. Utilizing an inner sleeve 36 of PVC is also advantageous because it has sufficient strength and rigidity to support the replacement discharge pipe 16' without requiring additional supports.

The outer sleeve 38 is somewhat compressible. For example, it may be formed of neoprene.

The ring clamp 40, which can be any conventional type of ring or band clamp, extends about the connector 34, preferably adjacent the TY section 24 of the soil stack 26. When the ring clamp 40 is tightened about the connector 34, the compressibility of the outer sleeve 38 permits its compression into sealing engagement with the ferrule 20.

To complete the replacement operation, the vertical section of the discharge pipe 16' is attached, for example, by an adhesive, to a flange 14' (see FIG. 2) which, like the flange 14 (see FIG. 1), will be connected and sealed to the toilet 10 after the removed portion of the floor 12 is replaced.

It will be understood that the described embodiment is merely exemplary and that persons skilled in the art may make many variations and modifications without departing from the spirit and scope of the invention. For example, the method is suitable for initially installing a discharge pipe or replacing discharge pipes made from materials other than lead (Pb). Also, the size, shape or configuration of the connector may be varied to suit the needs of a particular job. All such modifications and variations are intended to be included within the scope of the invention as defined in the appended claims.

I claim:

1. Apparatus for connecting a discharge pipe between a toilet to be supported on a floor and a section of a sewage system, the apparatus comprising:
    a ferrule, having one end sealed to the section of the sewage system;
    a rigid coupling having a rigid hollow element and a compressible hollow element arranged coaxially about the rigid hollow element and attached thereto so as to form at one end of the coupling a socket for receiving the other end of the ferrule, one end of the discharge pipe being permanently and fixedly attached to the inner surface of the rigid hollow element; and
    clamp means for compressing the compressible hollow element into sealing engagement with the ferrule, wherein the rigid hollow element engages and supports the ferrule and the discharge pipe and cooperates with the compressible hollow element and the clamp means so as to substantially prevent the ferrule from moving radially relative to the coupling, whereby the coupling rigidly couples the ferrule to the discharge pipe.

2. Apparatus according to claim 1, further comprising a flange on the other end of the discharge pipe for connection to the toilet.

3. Apparatus according to claim 1, wherein the rigid hollow element is made of plastic.

4. Apparatus according to claim 1, wherein the compressible hollow element is made of rubber.

5. Apparatus according to claim 1, wherein both of the hollow elements are cylindrical sleeves, whereby the socket is annular.

6. Apparatus according to claim 1, wherein both of the hollow elements are substantially coextensive with one another.

7. Apparatus according to claim 1, wherein the rigid hollow element has an outwardly extending flange thereabout for connection to the compressible hollow element.

8. Apparatus according to claim 1, wherein the clamp means is a ring clamp.

* * * * *